United States Patent
Sanford

[11] Patent Number: 6,152,645
[45] Date of Patent: Nov. 28, 2000

[54] BALL LOCK MECHANISM

[75] Inventor: Matthew J. Sanford, Bel Alton, Md.

[73] Assignee: The United States of America as represented by the Secretary of the Navy, Washington, D.C.

[21] Appl. No.: 09/211,002

[22] Filed: Dec. 15, 1998

[51] Int. Cl.[7] .................................................. B25G 3/18
[52] U.S. Cl. ...................... 403/328; 403/325; 403/322.2
[58] Field of Search .................................... 403/328, 327, 403/325, 322.2, 322.1, 320

[56] References Cited

U.S. PATENT DOCUMENTS

| | | | |
|---|---|---|---|
| 2,515,807 | 7/1950 | Spooner | 403/327 X |
| 3,302,960 | 2/1967 | Herrmann | 403/325 |
| 4,127,966 | 12/1978 | Schmidt | 49/141 |
| 4,198,080 | 4/1980 | Carpenter | 403/325 X |
| 4,444,084 | 4/1984 | Vessichelli | 87/57 |
| 4,537,100 | 8/1985 | Palm | 403/325 X |
| 4,775,269 | 10/1988 | Brix | 403/322.2 X |
| 4,901,836 | 2/1990 | Stenmark et al. | 403/328 X |
| 4,986,059 | 1/1991 | Boutilier | 54/2 |
| 5,566,595 | 10/1996 | Goff | 403/325 X |
| 5,601,380 | 2/1997 | Guthrie et al. | 403/328 X |
| 5,613,484 | 3/1997 | Troncoso | 403/325 X |
| 5,658,087 | 8/1997 | Butkovich et al. | 403/328 |
| 5,674,024 | 10/1997 | Daumal Castellon | 403/321 |

FOREIGN PATENT DOCUMENTS

| | | | |
|---|---|---|---|
| 1115998 | 10/1961 | Germany | 403/325 |
| 731101 | 10/1961 | U.S.S.R. | 403/325 |

*Primary Examiner*—Lynne H. Browne
*Assistant Examiner*—David E. Bochna
*Attorney, Agent, or Firm*—James B. Bechtel, Esq.; Peter J. Van Bergen, Esq.

[57] ABSTRACT

A ball lock mechanism has a shaft with an annular groove formed therearound. A first sleeve fitted on the shaft defines at least one channel between the first sleeve and the shaft. An opening facing away from the shaft is formed at the end of each channel. Ball bearings fill each channel so that, when the channels and annular groove are misaligned, one of the bearings extends partially through each channel's opening. A second sleeve is fitted over the first sleeve and the openings for retaining the bearings in the channels. The second sleeve is configured and movable with respect to the first sleeve to push the one bearing extending partially through each channel's opening into the channel when the channels and annular groove are aligned. As a result, another of the bearings is pushed into the annular groove while remaining partially in each channel to inhibit axial movement of the shaft relative to the first sleeve.

17 Claims, 2 Drawing Sheets

BALL LOCK MECHANISM

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to ball lock mechanisms, and more particularly to a ball lock mechanism that can remain locked in a direction of high loading yet be released by application of a small release force applied in a direction different than that of the loading force.

BACKGROUND OF THE INVENTION

A variety of ball lock mechanisms are known in the art. Typically, a ball (bearing) is positioned to cooperate with two items in order to prevent relative movement therebetween. For example, a ball lock is formed when a ball bearing is positioned to cooperate with the side walls of two-interfitting coaxial items to prevent axial movement between the items. To permit axial movement, the ball bearing must be disengaged from at least one of the items. In situations where large axial forces are present, a number of ball locks might be distributed about/between the items. Even with multiple ball locks, strong load forces can deform the ball bearings over time. Further, the ball locks must be released simultaneously in order to avoid load imbalances.

SUMMARY OF THE INVENTION

Accordingly it is an object of the present invention to provide a ball lock mechanism that prevents relative movement between two items.

Another object of the present intention is to provide a ball lock mechanism that can withstand large load forces.

Still another object of the present intention is to provide a ball lock mechanism that utilizes a plurality of ball locks, all of which can be easily and simultaneously released.

Other objects and advantages of the present invention will become more obvious hereinafter in the specification and drawings.

In accordance with the present invention, a ball lock mechanism has a shaft with an annular groove formed therearound. A first sleeve is fitted on the shaft for sliding engagement therewith. The first sleeve defines at least one channel between the first sleeve and the shaft that extends parallel to the shaft. The first sleeve incorporates an opening at one end of each channel facing away from the shaft. A plurality of bearings fill each channel so that, when the channel(s) and annular groove are misaligned, one of the bearings extends partially through the channel's opening. A second sleeve is fitted over the first sleeve and the opening(s) for retaining the bearings in the channel(s). The second sleeve is configured and movable with respect to the first sleeve to push the one bearing (extending partially through the channel(s) opening) into the channel when the channel(s) and annular groove are aligned. Another of the bearings is consequently pushed into the annular groove while remaining partially in each channel to inhibit axial movement of the shaft relative to the first sleeve. Springs can be added to the mechanism to facilitate locking and releasing of the mechanism.

DETAILED DESCRIPTION OF THE INVENTION

Figure 1:
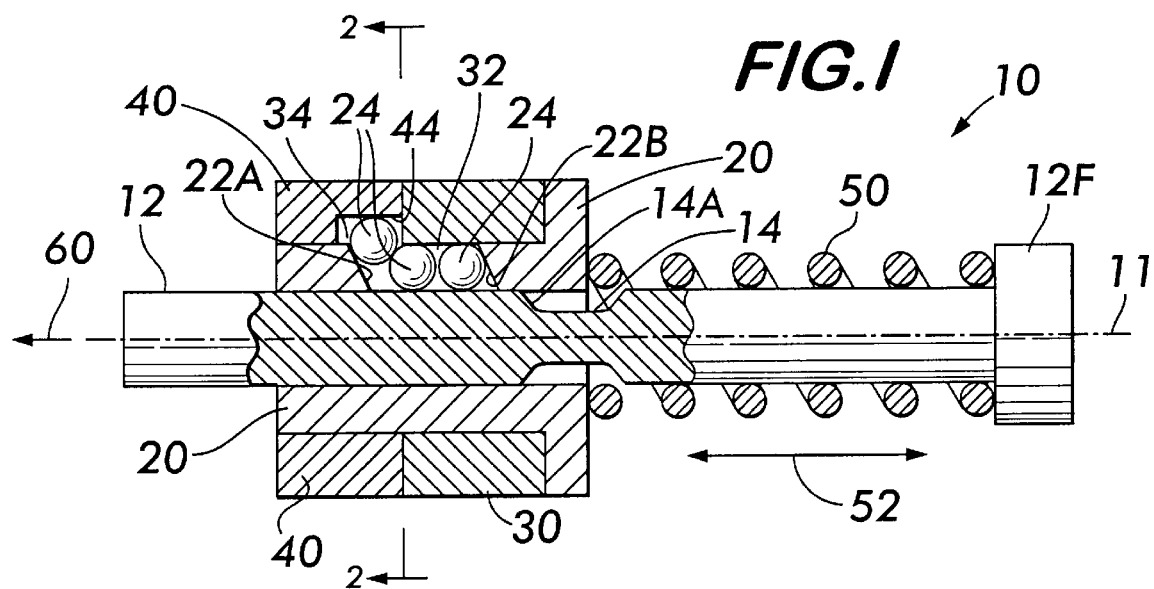
FIG. 1 is a side cross-sectional view of one embodiment of the ball lock mechanism according to the present invention in its unloaded at-rest position.
Figure 2:
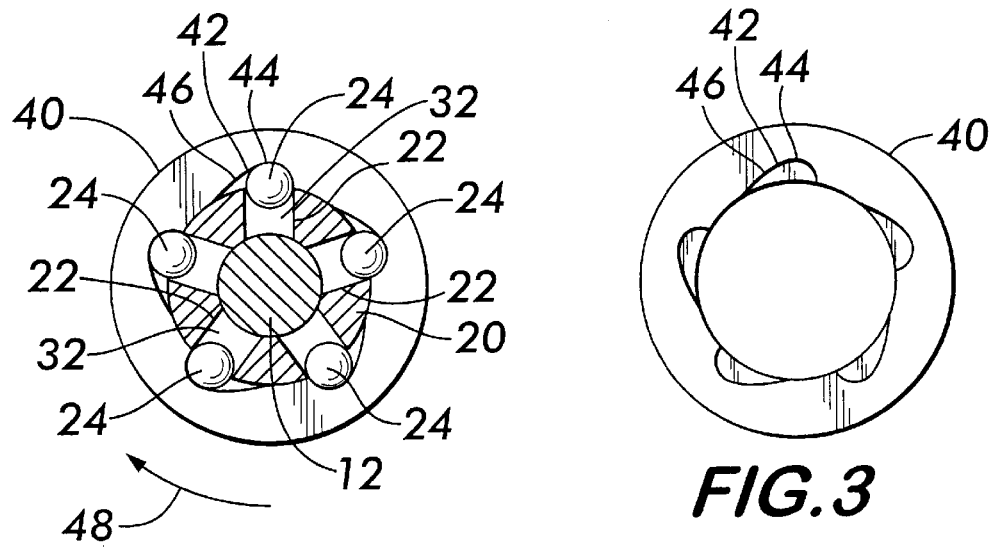
FIG. 2 is a cross-sectional view taken along 2—2 of FIG. 1.

Referring now to the drawings, and more particularly to FIGS. 1 and 2, one embodiment of the ball lock mechanism is shown in its at-rest position and is referenced generally by numeral 10. A rod or shaft 12 has an annular groove 14 formed therearound. For reasons that will be explained further below, groove 14 can have one sidewall 14A angled outward toward the end of shaft 12. That is, sidewall 14A forms a non-perpendicular angle with respect to longitudinal axis 11 of shaft 12.

Provided about shaft 12 are three sleeve elements. A keeper sleeve 20 slidingly engages shaft 12. Keeper sleeve 20 has one or more ports 22 formed therethrough. In the illustrated embodiment, five ports 22 are formed symmetrically about keeper sleeve 20 with one of ports 22 being visible in FIG. 1 and all five visible in FIG. 2 which is a view taken along line 2—2 in FIG. 1. Ports 22 are wide enough (as illustrated in FIG. 2) to tangentially receive ball bearings 24 therein and long enough (as illustrated in FIG. 1) to hold at least two ball bearings 24 fully within the confines of port 22 at all times. For reasons that will be explained further below, end walls 22A and 22B of each port 22 can be angled with respect to longitudinal axis 11. More specifically, end walls 22A and 22B are angled substantially the same as the nearest side wall (i.e., side wall 14A) of annular groove 14.

Fitted over one end of keeper sleeve 20 is a ring sleeve 30. Specifically, ring sleeve 30 extends over most of ports 22 such that a channel 32 is defined between ring sleeve 30 and shaft 12 over each of ports 22 while an opening 34 is formed at one end of each channel 32. Ring sleeve 30 is attached to keeper sleeve 20 by, for example, welding, screws, etc., or any other way known in the art. Ball bearings 24 are sized to slide within channel 32, i.e., ball bearings 24 are in tangential contact with the shaft 12 and ring sleeve 30. Opening 34 is sized to allow a ball bearing 24 to pass therethrough.

Figure 3:
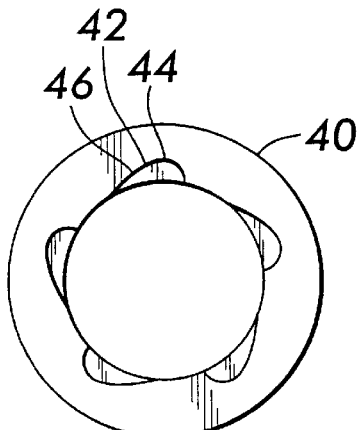
FIG. 3 is an isolated plan view of the latch sleeve.

Fitted over the other end of keeper sleeve 20 is a latch sleeve 40 that abuts ring sleeve 30. In the described embodiment, latch sleeve 40 is rotatable about keeper sleeve 30. On its interior, latch sleeve 40 is configured to position ball bearings 24 as will be described further below. While a variety of configurations will work, one configuration will be described by way of example. A plurality of ramped depressions 42 are provided to coincide with the number of ports 22 in keeper sleeve 20. As best illustrated in the isolated plan view of FIG. 3, each ramped depression 42 has a ball receiving portion 44 and a ramp portion 46 leading thereto.

As will be explained further below, ball lock mechanism 10 can be configured to lock automatically. For this to occur, latch sleeve 40 is spring-loaded in a direction of rotation about keeper sleeve 20. Specifically, latch sleeve 40 is spring-loaded to rotate such that each ball receiving portion 44 leads its ramped portion 46 as indicated by arrow 48 in FIG. 2 which is indicative of a direction of spring bias. A variety of springs could used to provide is not the rotational loading along spring bias 48 is not. For example such spring-loading can be provided by wrapping a clock-type or torsion spring 49 about part of ring sleeve 30 and part of latch sleeve 40 while coupling the ends of spring 49 to sleeves 30 and 40, respectively.

If it is necessary for ball lock mechanism to also be capable of releasing from its locked position, a spring 50 can be provided to bias shaft 12 and keeper sleeve 20 axially away from one another as indicated by two-headed arrow 52. For example, spring 50 can be disposed about shaft 12 and held in place between an annular flange end 12F of shaft 12 and keeper sleeve 20.

A plurality of ball bearings 24 fill the combination of each channel 32 and its associated opening 34/ball receiving portion 44 when ball lock mechanism 10 is in its at-rest position (FIGS. 1 and 2). In the illustrated embodiment, two of ball bearings 24 reside fully in channel 32 and one of ball bearings 24 (i.e., the leftmost one in FIG. 1) extends partially through opening 34 and into ball receiving portion 44. While spring bias 48 is tending to press the leftmost one of ball bearings 24 into channel 32, spring 50 maintains misalignment between ports 22 and annular groove 14 so that ball bearings 24 remain as shown in FIG. 1.

Figure 4:
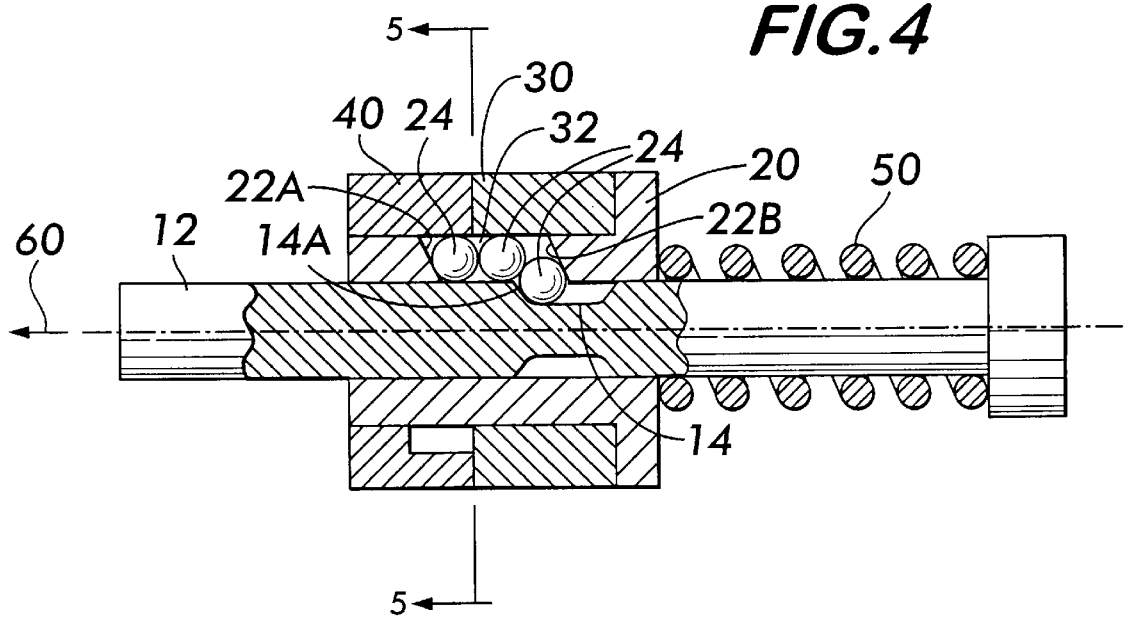
FIG. 4 is a side cross-sectional view of the ball lock mechanism of FIG. 1 in its loaded and locked position.
Figure 5:
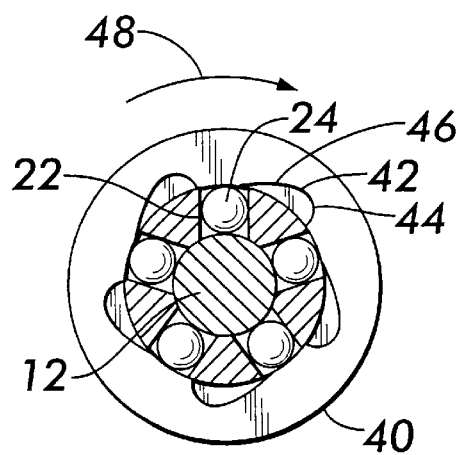
FIG. 5 is a cross-sectional view taken along line 5—5 of FIG. 4.

In operation, ball lock mechanism 10 is initially at-rest as shown in FIGS. 1 and 2. Specifically, spring 50 maintains misalignment between port 22 and annular groove 14 as described above. When it is desired to load and lock ball mechanism 10, shaft 12 is moved axially in the direction of loading (represented by arrow 60) against the bias of spring 50. When annular groove 14 is brought into alignment with port 22 by an amount equal to the diameter of the rightmost ball bearing 24, spring bias 48 rotates latch sleeve 40. To facilitate rotation of latch sleeve 40, the leftmost ball bearing 24 associated with each channel 32 can be made from a material that reduces frictional forces such as acetal which is manufactured by DuPont de Nemours, E.I. and Co. under the trademark DELRIN. During such rotation, each ramped portion 46 presses the leftmost ball bearing 24 fully into channel 32 while the rightmost ball bearing 24 is consequently forced into annular groove 14 as illustrated in FIGS. 4 and 5. The depth of annular groove 14 is less than the diameter of the rightmost ball bearing 24. As a result, spring bias 48 keeps the leftmost ball bearing in channel 32 while the rightmost ball bearing 24 locks keeper sleeve 20 to shaft 12 thereby inhibiting axial movement therebetween.

If and/or when it is desired to release ball lock mechanism 10 from the loaded and locked position illustrated in FIGS. 4 and 5, latch sleeve 40 is rotated against spring bias 46. When each ball receiving portion 44 is aligned over a corresponding opening 34, each leftmost ball bearing 24 is driven partially out of opening 34 and into ball receiving portion 44. The leftmost ball bearing 24 is driven to such motion by the bias in spring 50 which acts to misalign ports 22 and annular groove 14. However, spring 50 cannot act until each ball receiving portion 44 is aligned with a corresponding opening 34. It is at this moment that the leftmost ball bearing 24 can squirt into opening 34 and the rightmost ball bearing 24 can squirt fully into channel 32 to allow axial movement between shaft 12 and keeper sleeve 20.

The angle on side wall 14A (of annular groove 14) and end walls 22A and 22B (of ports 22) facilitate the invention's release action and also help to prevent dimpling of the load bearing surfaces. That is, because the angle is acute with respect to load direction 60, the load itself can help drive ball bearings 24 into their at-rest position once ball receiving portion(s) 44 are rotated over opening(s) 34.

The advantages of the present invention are numerous. An analysis of the forces on each of ball bearings 24 shows that the main load applied along load direction 60 is transmitted primarily to keeper sleeve 20 while only a small side component is directed to the release mechanism, i.e., latch sleeve 40. Thus, it is not necessary to remove the load before unlatching the mechanism. Control of the forces in this way is accomplished by the oblique-angle formation of ball bearings which introduce vector changes in the direction of the load forces. In addition, the simple sleeve-like shapes keeper sleeve 20, ring sleeve 30 and latch sleeve 40 keep fabrication cost down. The symmetric arrangement of multiple sets of ball bearings distributes the load about the ball lock mechanism. Further, since release of the mechanism is effected by application of a force that is not in conflict with load direction 60, and because the unlatching force is accomplished with a rotational movement that bears on ball bearings, very little unlatching force (as compared to the load force) is required. Also, the present invention's unlatching mechanism is not sensitive to shock and vibration due to various straightline forces (e.g., acceleration forces) because a rotational unlatching force (i.e., a two-dimensional force) is required.

Although the invention has been described relative to a specific embodiment thereof, there are numerous variations and modifications that will be readily apparent to those skilled in the art in light of the above teachings. For example, if shaft 12 and keeper sleeve 20 are index fit so that relative rotation therebetween was inhibited, the function of annular groove 14 could be accomplished by simple depressions in shaft 12 that would be aligned with ports 22. Other options could include the use of more than three ball bearings in each defined channel or the use of different sized ball bearings in a channel. Further, more or less sets of ball bearings can be used depending on the size of the lock mechanism and/or load forces. Still further, keeper sleeve 20 and ring sleeve 30 could be made as a single integral sleeve part. It is therefore to be understood that, within the scope of the appended claims, the invention may be practiced other than as specifically described.

What is claimed as new and desired to be secured by Letters Patent of the United States is:

1. A lock mechanism comprising:
   a shaft having a longitudinal axis and having an annular groove formed therearound;
   a first sleeve fitted on said shaft for sliding engagement therewith, said first sleeve defining at least one channel between said first sleeve and said shaft that extends parallel to said shaft, said first sleeve incorporating an opening at one end of said channel facing away from said shaft;
   a plurality of bearings filling said channel with at least two of said plurality of bearings being maintained in parallel alignment with said shaft and one of said plurality of bearings extending partially through said opening when said channel and said annular groove are misaligned; and
   a second sleeve fitted over said first sleeve and said opening for retaining said plurality of bearings in said channel, said second sleeve configured and movable with respect to said first sleeve to push said one of said plurality of bearings into said channel when said channel and said annular groove are aligned, wherein another of said plurality of bearings is consequently pushed into said annular groove while remaining partially in said channel to inhibit axial movement of said shaft relative to said first sleeve.

2. A lock mechanism as in claim 1 wherein each of said plurality of bearings is sized for tangential engagement with said first sleeve and said shaft when in said channel.

3. A lock mechanism as in claim 1 wherein each of said plurality of bearings is identically sized.

4. A lock mechanism as in claim 1 wherein said plurality of bearings comprises at least three ball bearings.

5. A lock mechanism as in claim 1 further comprising a spring coupled between said shaft and said first sleeve, said spring having a bias along said longitudinal axis to misalign said channel and said annular groove wherein said channel and said annular groove can be aligned by overcoming said bias.

6. A lock mechanism as in claim 5 further comprising means for moving said second sleeve to push said one of said plurality of bearings into said channel when said channel and said annular groove are aligned.

7. A lock mechanism as in claim 6 wherein said means for moving is a second spring coupled to said second sleeve for biasing said second sleeve in a direction of rotation about said longitudinal axis, said second sleeve being rotated by said second spring in said direction of rotation when said channel and said annular groove are aligned wherein rotation of said second sleeve in said direction of rotation pushes said one of said plurality of bearings into said channel which consequently pushes said another of said plurality of bearings into said annular groove, and wherein rotation of said second sleeve in a direction opposite said direction of rotation permits said bias of said spring to tend to misalign said channel and said annular groove thereby pushing said another of said plurality of bearings out of said annular groove to allow said shaft to slide through said first sleeve.

8. A lock mechanism as in claim 1 wherein said at least one channel comprises a plurality of channels arranged symmetrically about said shaft.

9. A lock mechanism as in claim 1 wherein said plurality of bearings are arranged by said shaft, said first sleeve and said second sleeve to define an oblique angle when said channel and said annular groove are aligned and misaligned.

10. A lock mechanism comprising:
  a shaft having a longitudinal axis and having an annular groove formed therearound, said annular groove defined by at least one sidewall that forms a non-perpendicular angle with respect to said longitudinal axis;
  a first sleeve fitted on said shaft for sliding engagement therewith, said first sleeve incorporating at least one port passing therethrough, said port defined by first and second opposing end walls that form a non-perpendicular angle with said longitudinal axis that is substantially equal to said non-perpendicular angle of said at least one sidewall of said annular groove;
  a second sleeve fitted over and fixed to said first sleeve, said second sleeve extending partially over said port to form an opening leading to a channel defined between said second sleeve and said shaft;
  a plurality of balls filling said channel wherein, when said port and said annular groove are misaligned, one of said plurality of balls extends partially through said opening and bears between said first end wall of said port and said second sleeve; and
  a third sleeve fitted over said first sleeve and abutting said second sleeve for retaining said one of said plurality of balls partially in said opening, said third sleeve configured and movable with respect to said first sleeve to push said one of said plurality of balls fully into said channel when said port and said annular groove are aligned, wherein another of said plurality of balls is consequently pushed into said annular groove while remaining partially in said channel to inhibit axial movement of said shaft relative to said first sleeve, said another of said plurality of balls bearing between said at least one sidewall of said annular groove and said second end wall of said port.

11. A lock mechanism as in claim 10 wherein each of said plurality of balls is sized for tangential engagement with said second sleeve and said shaft when in said channel.

12. A lock mechanism as in claim 10 wherein each of said plurality of balls is identically sized.

13. A lock mechanism as in claim 10 wherein said plurality of balls comprises at least three balls.

14. A lock mechanism as in claim 10 further comprising a spring coupled between said shaft and said first sleeve, said spring having a bias along said longitudinal axis to misalign said port and said annular groove wherein said port and said annular groove can be aligned by overcoming said bias.

15. A lock mechanism as in claim 14 further comprising means for moving said third sleeve to push said one of said plurality of balls into said channel when said port and said annular groove are aligned.

16. A lock mechanism as in claim 15 wherein said means for moving is a second spring coupled to said third sleeve for biasing said third sleeve in a direction of rotation about said longitudinal axis, said third sleeve being rotated by said second spring in said direction of rotation when said port and said annular groove are aligned wherein rotation of said third sleeve in said direction of rotation pushes said one of said plurality of balls fully into said channel which consequently pushes said another of said plurality of balls into said annular groove, and wherein rotation of said third sleeve in a direction opposite said direction of rotation permits said bias of said spring to tend to misalign said port and said annular groove thereby pushing said another of said plurality of balls out of said annular groove to allow said shaft to slide through said first sleeve.

17. A lock mechanism as in claim 10 wherein said at least one port comprises a plurality of ports arranged symmetrically about said first sleeve.

* * * * *